US010407048B1

(12) United States Patent
Sheldon et al.

(10) Patent No.: US 10,407,048 B1
(45) Date of Patent: Sep. 10, 2019

(54) HYBRID VEHICLE MOTOR COOLING

(71) Applicant: Ford Global Technologies, LLC, Dearborn, MI (US)

(72) Inventors: Daniel Frank Sheldon, Northville, MI (US); Kyi Shiah, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/918,260

(22) Filed: Mar. 12, 2018

(51) Int. Cl.
| | |
|---|---|
| *B60W 10/30* | (2006.01) |
| *B60H 1/00* | (2006.01) |
| *B60H 1/32* | (2006.01) |
| *B60W 20/00* | (2016.01) |
| *B60K 1/00* | (2006.01) |
| *B60K 6/48* | (2007.10) |
| *B60K 17/354* | (2006.01) |

(52) U.S. Cl.
CPC .......... *B60W 10/30* (2013.01); *B60H 1/0045* (2013.01); *B60H 1/00385* (2013.01); *B60H 1/00764* (2013.01); *B60H 1/00885* (2013.01); *B60H 1/3208* (2013.01); *B60H 1/3222* (2013.01); *B60K 1/00* (2013.01); *B60K 6/48* (2013.01); *B60W 20/00* (2013.01); *B60H 2001/00307* (2013.01); *B60H 2001/3267* (2013.01); *B60H 2001/3294* (2013.01); *B60K 17/354* (2013.01); *B60K 2001/006* (2013.01); *B60W 2510/087* (2013.01); *B60W 2510/305* (2013.01); *B60Y 2200/92* (2013.01); *B60Y 2306/05* (2013.01)

(58) Field of Classification Search
CPC .............. B60H 1/00271; B60H 1/0028; F25B 2600/25; F25B 2600/2501; F25B 2600/2507; F25B 2600/2511

USPC ............................ 165/202, 203; 62/175, 203
See application file for complete search history.

(56) References Cited

U.S. PATENT DOCUMENTS

| 7,102,267 | B2 | 9/2006 | Gromoll et al. | |
|---|---|---|---|---|
| 8,080,909 | B2 | 12/2011 | Perkins | |
| 8,909,398 | B2 | 12/2014 | Sawada et al. | |
| 9,500,273 | B2 | 11/2016 | Suzuki et al. | |
| 2008/0236181 | A1* | 10/2008 | Zhu ..................... | B60H 1/00278 62/239 |
| 2008/0250802 | A1* | 10/2008 | Iritani ................... | F25B 31/006 62/228.1 |
| 2012/0085114 | A1* | 4/2012 | Graaf .................. | B60H 1/00278 62/238.7 |
| 2012/0125032 | A1* | 5/2012 | Graaf .................. | B60H 1/00278 62/318 |

(Continued)

FOREIGN PATENT DOCUMENTS

| JP | 2004140881 A | | 5/2004 |
|---|---|---|---|
| JP | 2014001721 A | * | 1/2014 |

*Primary Examiner* — Allen J Flanigan
(74) *Attorney, Agent, or Firm* — David Kelley; Brooks Kushman P.C.

(57) ABSTRACT

A vehicle utilizes an internal combustion powertrain to propel front wheels and an Electric Rear Axle Drive (ERAD) to propel rear wheels. In some circumstances, a controller may need to limit motor torque in the ERAD to avoid overheating the motor, which reduces fuel efficiency. To reduce the likelihood of needing to limit motor torque, refrigerant from the vehicle air conditioning system is circulated through the motor housing. In response to commands from a controller, a valve routes the refrigerant either through the air conditioning system evaporator or through the motor housing.

14 Claims, 6 Drawing Sheets

(56) References Cited

U.S. PATENT DOCUMENTS

| | | | |
|---|---|---|---|
| 2013/0319038 A1* | 12/2013 | Kawase | B60H 1/00278 62/498 |
| 2014/0109613 A1* | 4/2014 | Ohno | B60H 1/00278 62/498 |
| 2014/0190203 A1* | 7/2014 | Jojima | B60H 1/00278 62/511 |
| 2014/0202178 A1* | 7/2014 | Trumbower | B60L 11/1874 62/62 |
| 2014/0311180 A1* | 10/2014 | Kawakami | B60H 1/00278 62/498 |
| 2015/0033791 A1* | 2/2015 | Yamada | F04F 5/20 62/500 |
| 2015/0292776 A1* | 10/2015 | Tepas | F25B 5/02 62/117 |

\* cited by examiner

_US 10,407,048 B1_

HYBRID VEHICLE MOTOR COOLING

TECHNICAL FIELD

This disclosure relates to the field of hybrid electric motor vehicles. More particularly, the disclosure relates to a system and method of cooling a traction motor using refrigerant from the vehicle air conditioning system.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Some vehicles employ electric motors used in combination with the internal combustion engine to decrease fuel consumption. For example, an electric motor may be used to recapture energy that would otherwise be converted to heat during braking and then use that energy to reduce the power demand on the internal combustion engine. Also, the motor may supplement the power of the internal combustion engine during acceleration events such that a smaller, more efficient engine may be installed without sacrificing performance.

SUMMARY OF THE DISCLOSURE

A vehicle includes a traction motor, a cabin air conditioning system, and a valve. The cabin air conditioning system includes a compressor, a condenser, and an evaporator. The air conditioning system may also include a thermostatic expansion valve to control a refrigerant flow rate based on a temperature of the refrigerant leaving the evaporator. The compressor may be selectively drivably connected to the internal combustion engine by a clutch. The valve is configured to route refrigerant from the condenser to the compressor alternately through the evaporator and a housing of the motor. A controller may be programmed to command the valve to route fluid through the housing in response to a temperature of the motor exceeding a threshold. The controller may also engage the clutch in response to the temperature exceeding the threshold. The controller may also be programmed to command the valve to route fluid through the evaporator in response to a cabin temperature exceeding a set point, regardless of the temperature of the motor.

A vehicle includes a traction motor, a cabin air conditioning system, and a controller. The cabin air conditioning system including a compressor, a condenser, and an evaporator. The compressor may be selectively drivably connected to an internal combustion engine by a clutch. The air conditioning system may also include a thermostatic expansion valve configured to control a refrigerant flow rate based on a temperature of the refrigerant leaving the evaporator. The controller is programmed to route refrigerant from the condenser to the compressor through the housing in response to a temperature of the motor exceeding a threshold and through the evaporator in response to the temperature being less than the threshold. The controller may be further programmed to engage the clutch in response to the temperature of the motor exceeding the threshold and in response to air conditioning being requested by cabin occupants. The controller may be further programmed to route refrigerant through the evaporator in response to a cabin temperature exceeding a threshold, regardless of the temperature of the motor.

A method controls a vehicle having a traction motor and an air conditioning system. A compressor is commanded to pump a refrigerant to a condenser, for example, by commanding engagement of a clutch to driveably connect the compressor to an internal combustion engine. The refrigerant leaving the compressor is routed to the motor in response to a motor temperature exceeding a threshold and to an evaporator in response to a motor temperature being less than the threshold. The refrigerant may also be routed to the evaporator in response to a cabin temperature exceeding a set point regardless of the motor temperature.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
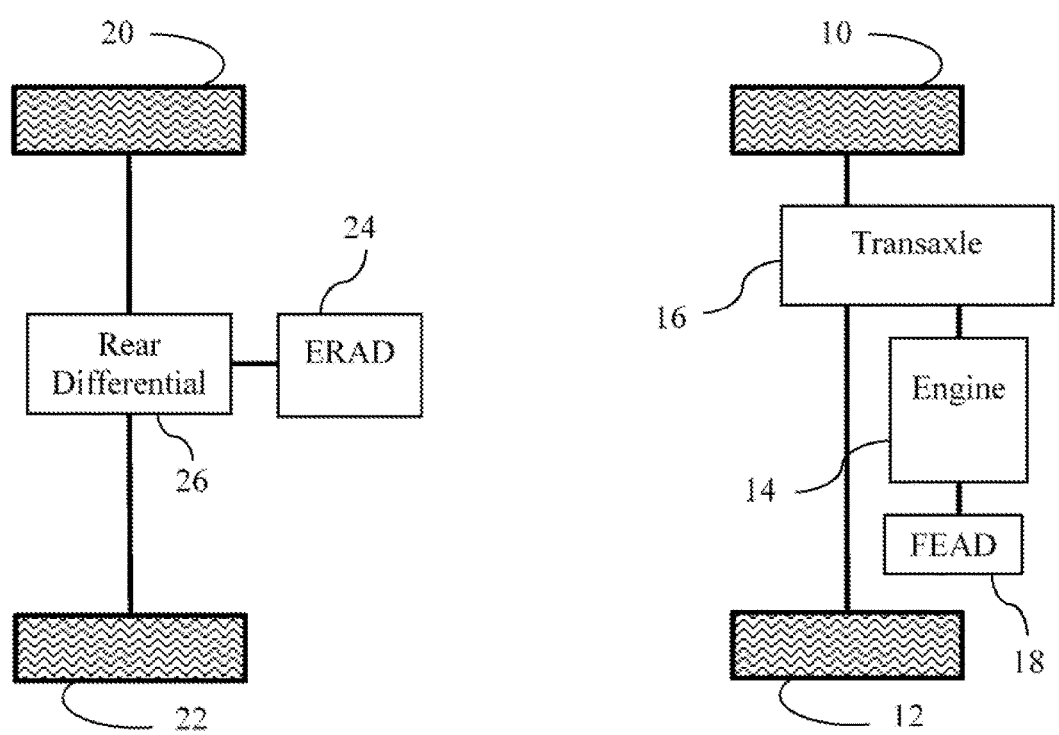
FIG. 1 is a schematic diagram of an automotive powertrain.

FIG. 1 schematically illustrates a vehicle powertrain. Power to front wheels 10 and 12 is supplied by supplied by internal combustion engine 14. Transaxle 16 adjusts the speed ratio between the engine crankshaft and the wheels to accommodate various driving conditions. For example, at low vehicle speeds, the speed ratio is set to provide torque multiplication while at higher vehicle speeds and low power demands, the speed ratio is set to maximize engine efficiency. Transaxle 16 includes a differential that divides the power between left front wheel 10 and right front wheel 12 while permitting slight speed differences when the vehicle turns. Front End Accessory Drive (FEAD) 18 directs some portion of the engine power to various accessories such as an alternator, an engine coolant pump, and an air conditioning system as described below.

Power to rear wheels 20 and 22 is supplied by Electric Rear Axle Drive (ERAD) 24. The power generated by ERAD 24 is divided between the rear wheels by rear differential 26. ERAD 24 receives power from a battery (not shown). During braking, ERAD 24 may act as a generator to recover a portion of the vehicle kinetic energy and store that energy in the battery. A controller decides how much torque should be provided by the engine 14 and the ERAD 24 respectively such that the total torque satisfies the driver demand efficiently. If the controller detects loss of traction at either front or rear wheels, the controller revises the torque allocation to deliver the torque via the wheels with traction.

Figure 2:
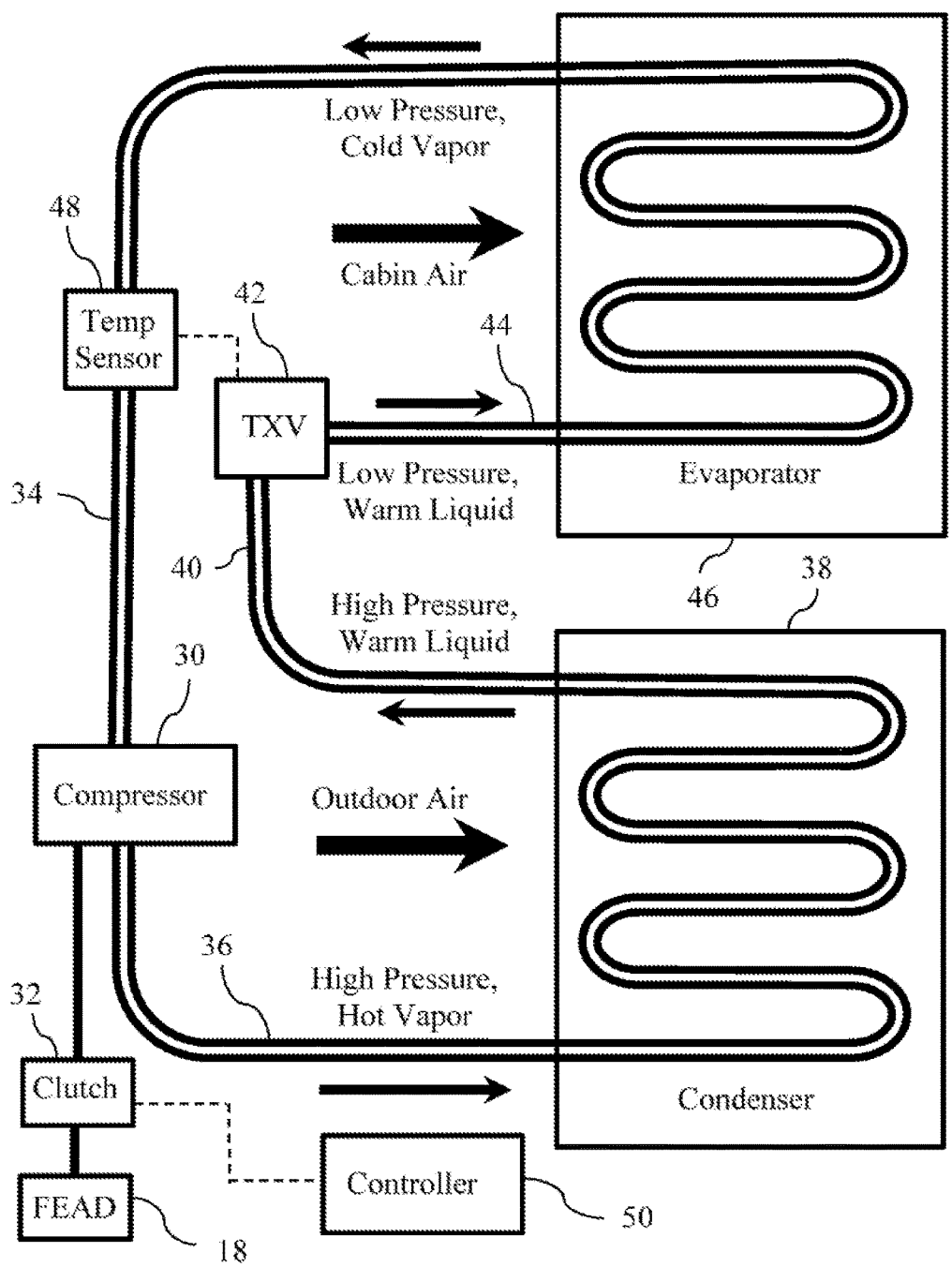
FIG. 2 is a schematic diagram of a vehicle air conditioning system.

A cabin air conditioning system is illustrated schematically in FIG. 2. Compressor 30 is drivably connected to the engine crankshaft via FEAD 18 whenever clutch 32 is engaged. The compressor draws refrigerant, in a vapor state, from low pressor vapor line 34, and pumps it to high pressure vapor line 36. Due to the energy added to the refrigerant during compression, the temperature of the vapor in line 36 is much higher than the temperature in line 34. The temperature at which the refrigerant transitions between vapor and liquid is a function of temperature. The transition occurs at higher temperatures when the pressure is higher. The temperature in line 36 is at least as high as the transition temperature at the high pressure, which is higher than ambient outdoor temperature. (Vapor at a temperature above the transition temperature is called superheated.)

The refrigerant then flows through heat exchanger 38 which is called the condenser. The condenser is located in a stream of outdoor ambient air (such as in front of the engine's radiator). Heat is transferred from the refrigerant to the outdoor air. Initially, this causes the refrigerant to cool from a superheated state to the transition temperature. Then, the refrigerant condenses to liquid at the transition temperature. Finally, the refrigerant, in liquid state, continues cooling toward the outdoor air temperature before exiting the condenser via high pressure liquid line 40. The majority of the reduction in enthalpy as the refrigerant flows through the condenser is due to the state change.

From high pressure liquid line 40, the refrigerant flows through a controlled orifice in Thermostatic eXpansion Valve (TXV) 42 and enters low pressure liquid line 44. From low pressure liquid line 44, the refrigerant flows through heat exchanger 46, called the evaporator. The reduction in pressure reduces the transition temperature to value lower than the temperature of the liquid in line 44. As a result, the refrigerant begins to evaporate from its liquid state to a vapor state, absorbing energy. Initially, the energy comes from the refrigerant itself, causing the liquid/vapor mixture to cool to the transition temperature, which is less than the cabin air temperature. A fan blows cabin air past the evaporator such that heat is transferred from the cabin air to the refrigerant, cooling the cabin air. The refrigerant emerges from evaporator 46 in vapor state and flow into low pressure vapor line 34 from which it is recirculated.

TXV 42 adjusts the size of its orifice to control the flow rate of refrigerant. TXV 42 One of the inputs that influences the orifice size is the temperature in low pressure vapor line 34 as determined by sensor 48. Specifically, TXV 42 increases the size of the orifice in response to increased temperature at 48, thus increasing refrigerant flow rate. The higher temperature is an indication that the evaporator is not removing enough heat from the cabin air, so additional flow rate is warranted. Sensor 48 may be a passive temperature sensor that sends a pressure signal to TXV 42. Temperature sensor 48 may be integrated into TXV 42. TXV 42 may also respond to the pressure in either low pressure liquid line 44 or in low pressure vapor line 34. Specifically, TXV 42 reduces the size of the orifice in response to increased pressure.

When the AC system is turned off by vehicle occupants, controller 50 disengages clutch 32 such that compressor 30 does not operate and refrigerant does not flow. When the AC system is turned on by vehicle occupants, controller 50 engages clutch 32 to operate compressor 30. Once a target pressure is achieved in line 36, the controller may cycle compressor 30 on and off by engaging and disengaging clutch 32 as required to maintain the pressure within a target range. In some vehicles, compressor 30 may be driven by an electric motor instead of being driven by the engine. This permits operation of the air conditioning system with the engine off. In such systems, controller 50 controls the pressure in line 30 by cycling the motor on and off or by varying its speed.

Figure 3:
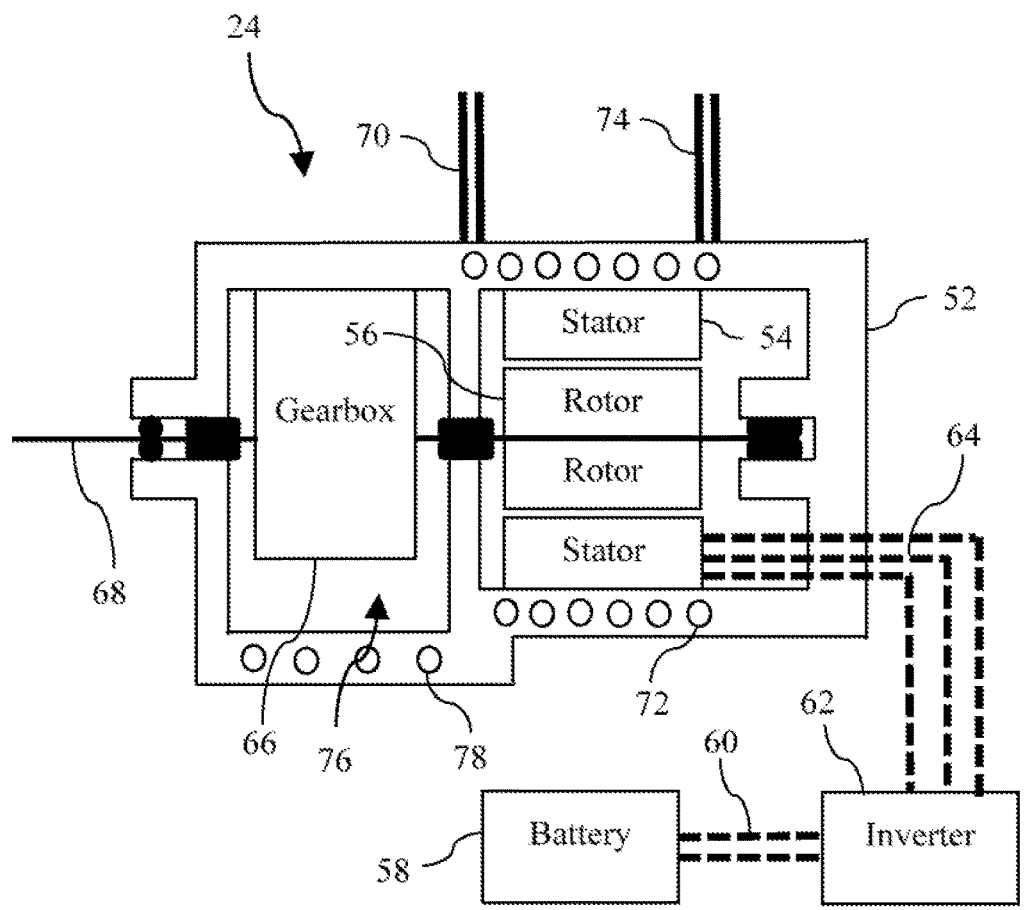
FIG. 3 is an illustration of a Electric Rear Axle Drive (ERAD).

ERAD 24 of FIG. 1 is illustrated in more detail in FIG. 3. The ERAD includes a housing 52 that is mounted to vehicle structure. The permanent magnet synchronous electric machine includes a stator 54 and a rotor 56. Stator 54 is fixed to the housing. Rotor 56 is supported for rotation relative to the housing by bearings. Stator 54 and rotor 56 are separated by a small air gap. Battery 58 provides or absorbs electric power via Direct Current (DC) bus 60. Inverter 62 converts the DC voltage to Alternating Current (AC) on three power cables 64. The Power cables are connected to phase windings in stator 54. Inverter 62 adjusts the magnitude and phase of the voltage on the power cables to generate a desired level of torque. Gearbox 66 adjusts a speed ratio between rotor 56 and ERAD output shaft 68 which drives rear differential 26. Gearbox 66 may also include a clutch which selectively disconnects the rotor from the rear wheels.

Productions of torque by the electric machine results in generation of heat in stator 54 and in rotor 56. Operation at an excessive temperature can damage the hardware. Therefore, if a temperature of the stator or rotor exceed a threshold, about 150 C, the torque command must be limited to limit generation of additional heat. Limiting the torque capability limits the ability to use the ERAD to reduce fuel consumption. Heat from stator 54 is dissipated by conduction to housing 52. The housing may be actively cooled by a coolant that is circulated from line 70, through helical passageways 72, to line 74, and then through a radiator before returning to line 70. The coolant may be, for example, a mixture of water and glycol. Gearbox 66 and rotor 56 may be cooled by circulation of gear oil. When the gear oil is in housing sump 76, heat is transferred from the oil to housing 52. To assist in cooling the area of the housing near the sump, the coolant may be circulated through additional passageways 78 near the sump.

The rate of heat transfer from the housing 52 to the coolant is proportional to the temperature difference between the housing and the coolant. The temperature of the coolant entering from line 70 is higher than ambient air temperature. As the coolant circulates through the passageways, the coolant temperature increases, reducing the heat transfer rate. On a hot day, coolant temperature can be in the 50-70 C range.

Figure 4:
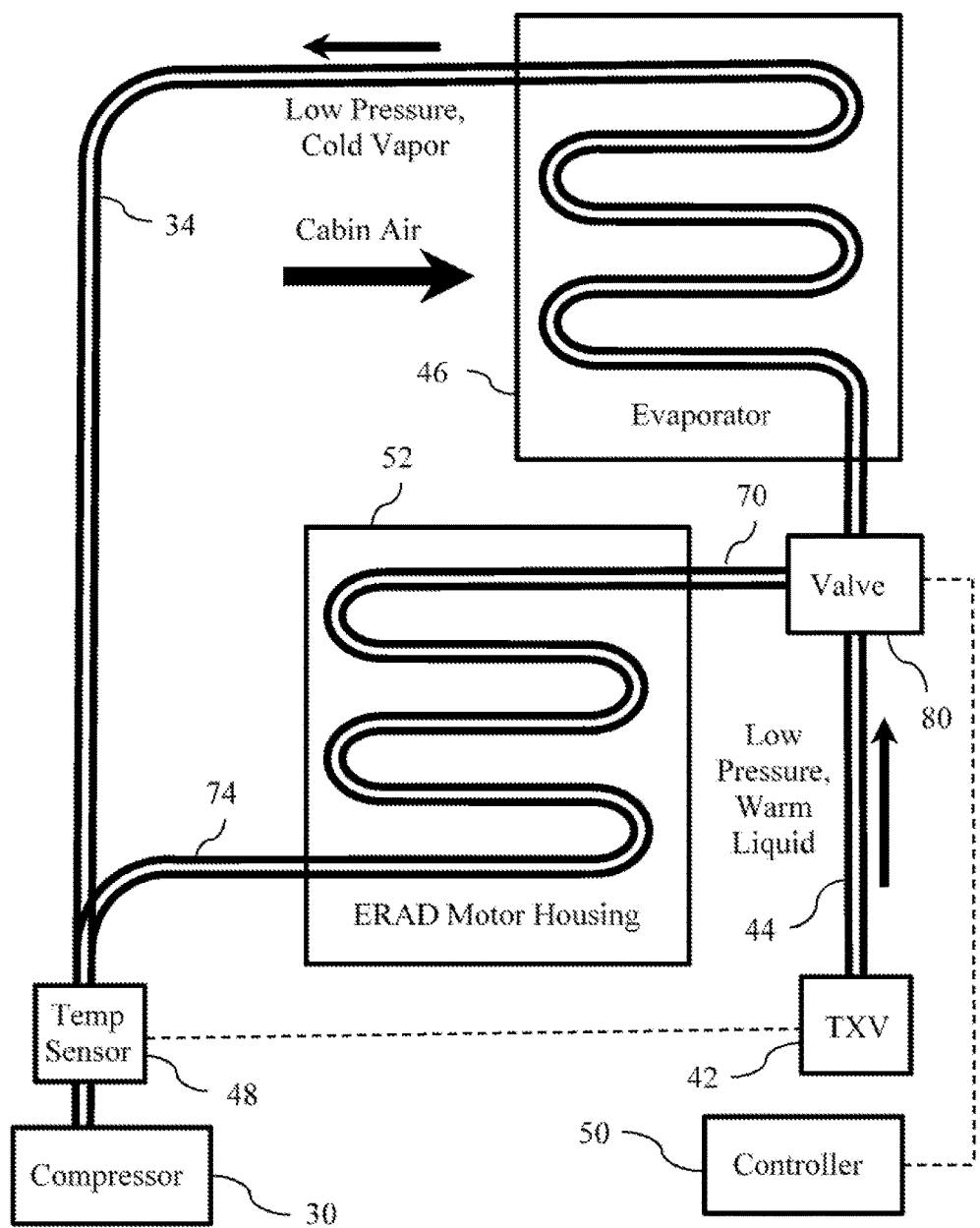
FIG. 4 is a schematic diagram of a first embodiment of a cooling system for the ERAD of FIG. 3 utilizing the air conditioning system of FIG. 2.

FIG. 4 illustrates a modification to the air conditioning system of FIG. 2 which dramatically increases the potential heat removal rate from the ERAD by circulating refrigerant through the housing instead of water and glycol. At some points in the vapor compression cycle described above, the refrigerant temperature is reduced to about 5 C. Furthermore, as the refrigerant transitions from liquid to vapor, the temperature remains essentially constant even as substantial heat is absorbed.

Valve 80 is placed in low pressure liquid line 44 between TXV 42 and evaporator 46. Valve 80 routes refrigerant from the condenser alternately through the evaporator 46 and the housing 52. In other words, valve 80 has at least two states. In a first state, refrigerant flows predominantly through evaporator 46 with no or low flow through motor housing 52. In a second state, refrigerant flows predominantly through motor housing 52 with no or low flow through evaporator 46. In some embodiments, valve 80 may have intermediate states in which substantial flow is directed through both devices. The state of valve 80 is set by controller 50 using logic described below. The refrigerant returning from the motor housing is merged into low pressure vapor line 34 upstream of temperature sensor 48.

Figure 5:
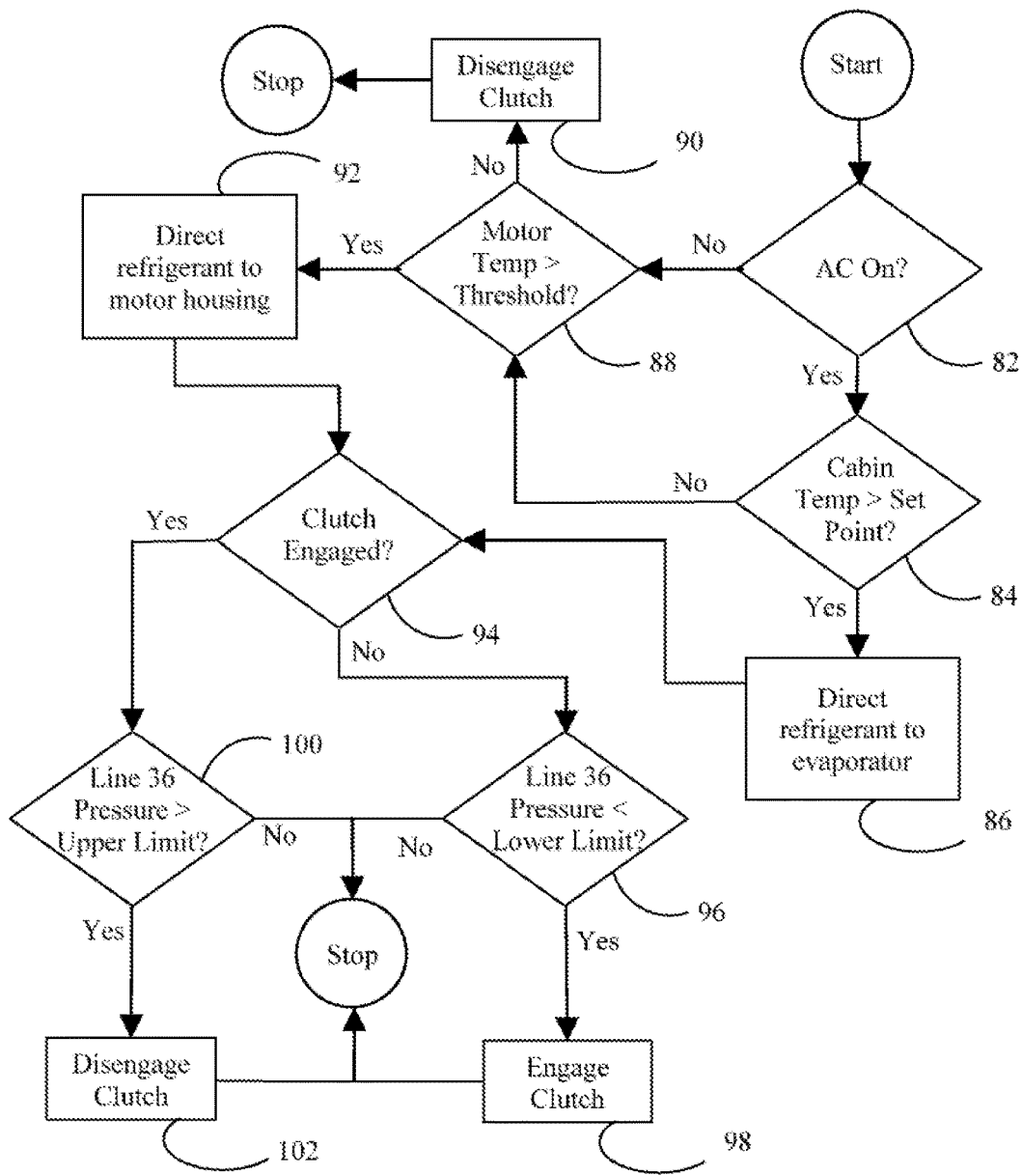
FIG. 5 is a flow chart illustrating control logic for operating the ERAD cooling system of FIG. 4.

FIG. 5 is a flow chart illustrating control logic for controlling clutch 32 of FIG. 2 and valve 80 of FIG. 4. This process would be executed by controller 50 at regular intervals, such as in response to an interrupt signal. At 82, the controller checks whether the air conditioning has been turned on by vehicle occupants. If so then the controller checks at 84 whether the cabin temperature is above the set point. If so, then, at 86, the controller sets valve 80 to direct refrigerant to evaporator 46. In this way, cabin air condition gets priority over ERAD motor cooling. If the air conditioning is off at 82 or the cabin temperature set point is satisfied at 84, then the controller checks at 88 whether the motor temperature is above a threshold. The threshold may be less than the temperature at which the controller must begin limiting motor power. If the motor is below the threshold temperature at 88, clutch 32 is disengaged at 90 such that the air conditioning system does not consume power. If the motor is above the threshold temperature at 88, then, at 92, the controller sets valve 80 to direct refrigerant to motor housing 52.

Once the state of valve 80 is set, either at 86 or 92, the controller proceeds to control the state of clutch 32 to maintain the pressure in high pressure liquid line 36 between a lower limit and an upper limit. At 94, the controller checks the current status of the clutch. If the clutch is not currently engaged, then the controller compares the pressure in line 36 to the lower limit at 96. If the pressure is below the lower limit, then the controller engages clutch 32 at 98. Otherwise, the controller leaves clutch 32 disengaged. If the clutch is currently engaged at 94, then the controller compares the pressure in line 36 to the upper limit at 100. If the pressure is above the upper limit, then the controller disengages clutch 32 at 102. Otherwise, the controller leaves clutch 32 engaged.

Figure 6:
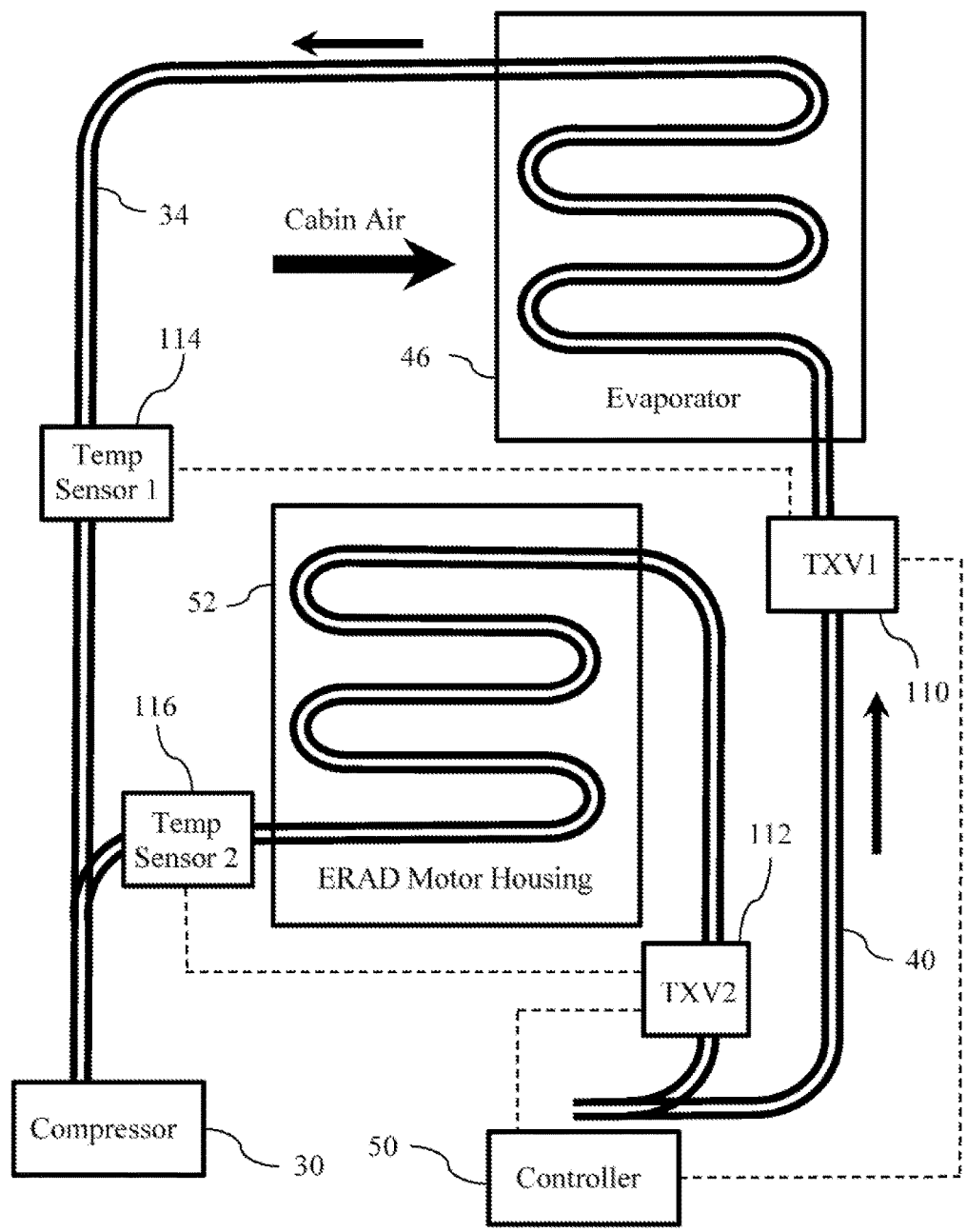
FIG. 6 is a schematic diagram of a second embodiment of a cooling system for the ERAD of FIG. 3 utilizing the air conditioning system of FIG. 2.

FIG. 6 illustrates an alternative embodiment of the motor cooling system of FIG. 4. Instead of using a single TXV and a valve, this embodiment utilizes two TXVs. The first TXV 110 controls the flow of refrigerant to evaporator 46. The second TXV 112 controls the flow of refrigerant to motor housing 52. TXVs 110 and 112 may have different dimensions to better correspond to different characteristics of evaporator 46 and motor housing 52. As shown, TXVs 110 and 112 utilize two different temperature sensors 114 and 116 respectively, although a shared temperature sensor could also be utilized. TXVs 110 and 112 are configured to completely close the orifice in response to a signal from controller 50. This could be accomplished, for example, by a solenoid that acts on the needle of a needle-type TXV. Alternatively, it could be accomplished by placing an on/off valve in series with the TXV.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A vehicle comprising:
   a traction motor configured to propel the vehicle, the motor having a housing; and
   a cabin air conditioning system including a compressor, a condenser, an evaporator, an expansion valve disposed downstream of the condenser and upstream of the evaporator, and a valve disposed downstream of the expansion valve, the valve including an inlet connected to the expansion valve, a first outlet connected to the housing, and a second outlet connected to the evaporator, wherein the valve is configured to proportion refrigerant between the housing and the evaporator between 0 and 100 percent, inclusive.

2. The vehicle of claim 1 wherein the valve is a thermostatic expansion valve.

3. The vehicle of claim 1 further comprising a controller programmed to command the valve to proportion at least some of the refrigerant to the housing in response to a temperature of the motor exceeding a threshold.

4. The vehicle of claim 3 wherein the compressor is selectively drivably connected to an internal combustion engine by a clutch and the controller is further programmed to engage the clutch in response to the temperature of the motor exceeding the threshold.

5. The vehicle of claim 1 wherein the controller is further programmed to command the valve to proportion 100 percent of the refrigerant to the evaporator in response to a cabin temperature exceeding a set point, regardless of the temperature of the motor.

6. The vehicle of claim 1 wherein the traction motor is configured to drive rear wheels of the vehicle and an internal combustion engine is configured to drive front wheels of the vehicle.

7. A vehicle comprising:
   a traction motor configured to propel the vehicle, the motor having a housing;

a cabin air conditioning system including a compressor, a condenser, an evaporator, an expansion valve disposed downstream of the condenser and upstream of the evaporator, and a valve disposed downstream of the expansion valve, the valve including an inlet connected to the expansion valve, a first outlet connected to the housing, and a second outlet connected to the evaporator, wherein the valve is configured to proportion refrigerant between the housing and the evaporator between 0 and 100 percent, inclusive; and a controller programmed to proportion at least some of the refrigerant to the housing in response to a temperature of the motor exceeding a threshold and to proportion 100 percent of the refrigerant to the evaporator in response to the temperature being less than the threshold.

8. The vehicle of claim 7 wherein the valve is a thermostatic expansion valve.

9. The vehicle of claim 7 wherein the compressor is selectively drivably connected to an internal combustion engine by a clutch and the controller is further programmed to engage the clutch in response to the temperature of the motor exceeding the threshold and in response to air conditioning being requested by cabin occupants.

10. The vehicle of claim 7 wherein the controller is further programmed to proportion 100 percent of the refrigerant to the evaporator in response to a cabin temperature exceeding a second threshold, regardless of the temperature of the motor.

11. The vehicle of claim 7 wherein the traction motor is configured to drive rear wheels of the vehicle and an internal combustion engine is configured to drive front wheels of the vehicle.

12. A method of controlling a vehicle having a cabin air conditioning system including a compressor, a condenser, an evaporator, an expansion valve disposed downstream of the condenser and upstream of the evaporator, and a valve disposed downstream of the expansion valve, the valve including an inlet connected to the expansion valve, a first outlet connected to a motor housing, and a second outlet connected to the evaporator, the method comprising:

via a vehicle controller, proportioning at least some of the refrigerant to the motor housing in response to a temperature of the motor exceeding a threshold and to proportion 100 percent of the refrigerant to the evaporator in response to the temperature being less than the threshold.

13. The method of claim 12 further comprising proportioning 100 percent of the refrigerant to the evaporator in response to a cabin temperature exceeding a second threshold, regardless of the motor housing temperature.

14. The method of claim 12 further comprising proportioning the refrigerant between the motor housing and the evaporator in response to the motor housing exceeding the threshold and the cabin temperature being less the second threshold.

* * * * *